March 26, 1929.　　　　J. A. WRIGHT　　　　1,706,556
FRONT AXLE ASSEMBLY
Filed May 4, 1927　　　3 Sheets-Sheet 1

INVENTOR.
JAMES A. WRIGHT.
By
ATTORNEY.

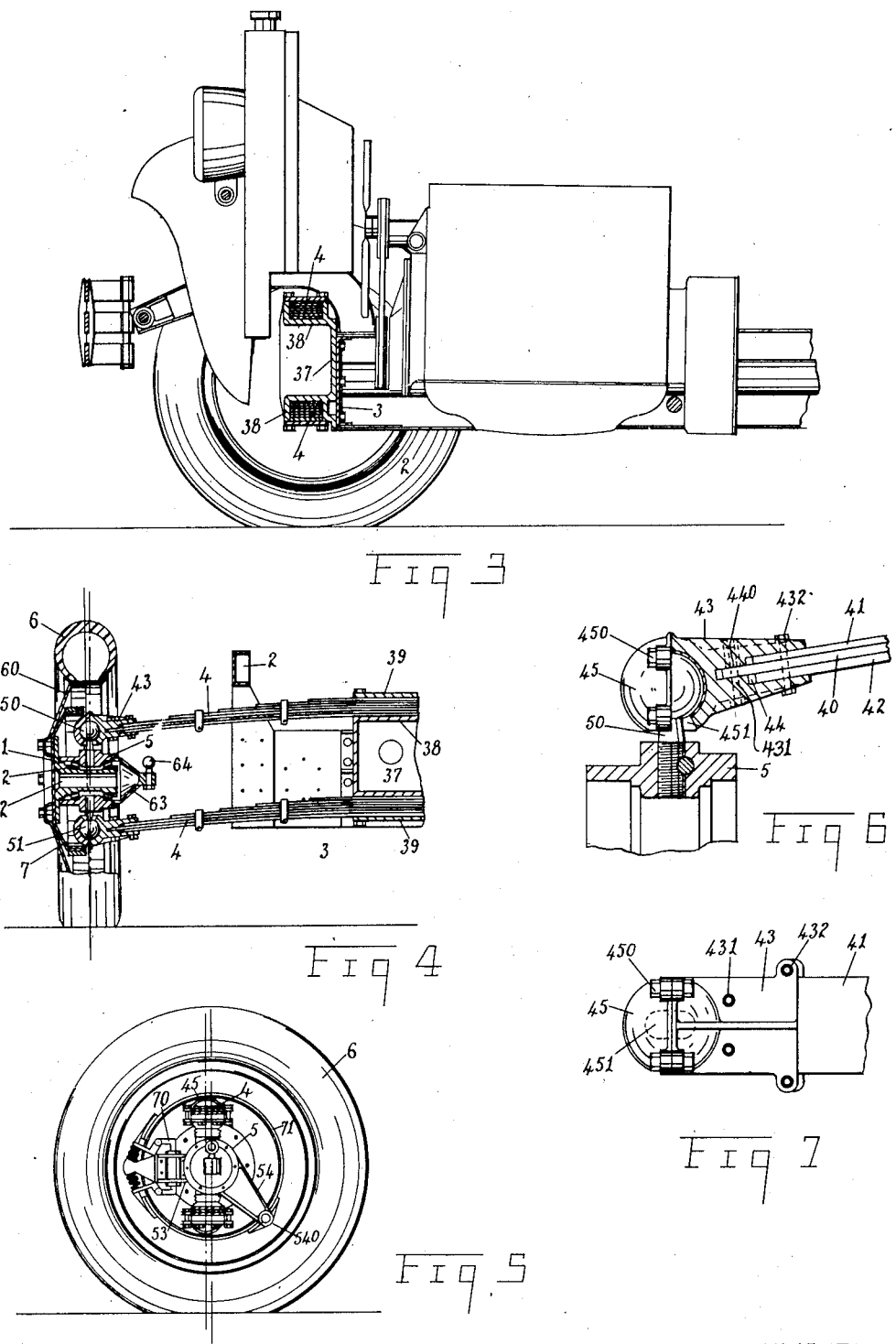

March 26, 1929.  J. A. WRIGHT  1,706,556

FRONT AXLE ASSEMBLY

Filed May 4, 1927  3 Sheets-Sheet 3

INVENTOR
JAMES A. WRIGHT.
By
ATTORNEY.

Patented Mar. 26, 1929.

1,706,556

UNITED STATES PATENT OFFICE.

JAMES A. WRIGHT, OF MONTREAL, QUEBEC, CANADA.

FRONT-AXLE ASSEMBLY.

Application filed May 4, 1927. Serial No. 188,768.

This invention relates to the front axle assembly of motor vehicles and particularly to those having independent wheel suspension, by means of transverse springs.

The object of the invention is to provide an improved front wheel spring suspension.

A further object is to provide an improved wheel carrier whereby the castor effect is obtained in a novel manner, and the wheel is maintained in position in relation to the chassis.

A further object is to provide a novel and improved spring eye or terminal for the springs, by means of which they are coupled to the wheel carrier.

A further object is to provide an improved wheel mounting by which the wheel is journalled in the wheel carrier.

A further object is to provide an improved steering arm mounted on and controlling the pivoting of the wheel carrier.

A further object is to provide an improved brake mounting within the wheel.

Other objects will be set forth hereinafter.

The invention consists in a pair of transverse springs mounted in seats in a yoke block secured to the chassis frame, the ends of these springs being connected to the wheel carriers of the wheels by a special form of spring eye or terminal and ball pivots.

The wheel carriers support the brake control mechanism and band anchors. The brake drums are supported directly on the hubs of the wheels. The steering arm forms a cap to the stub axles, on the wheel carrier.

Figure 1:
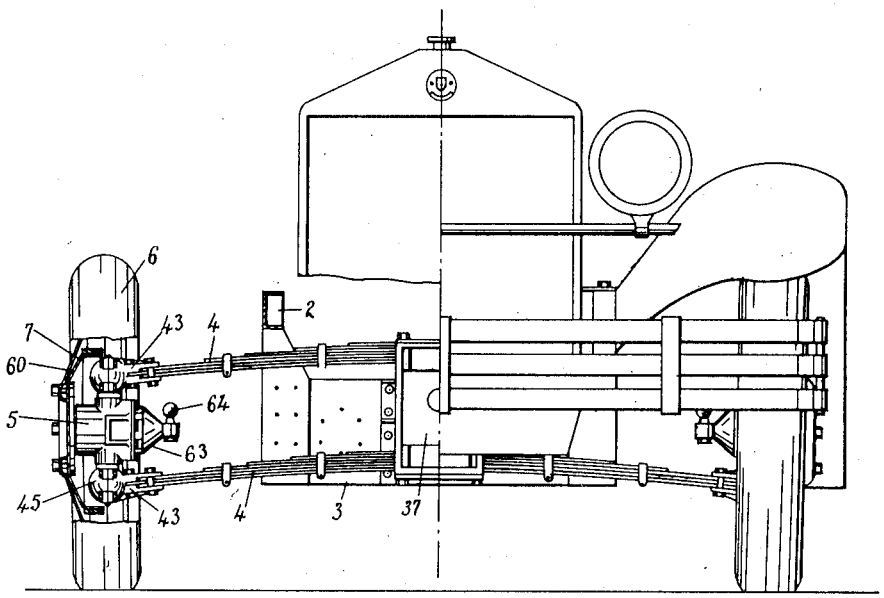
Figure 2:
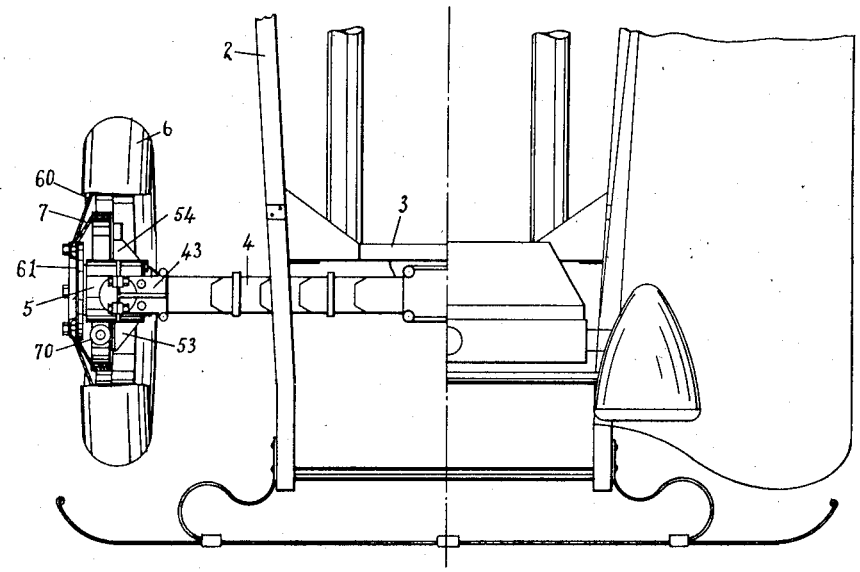
Figure 8:
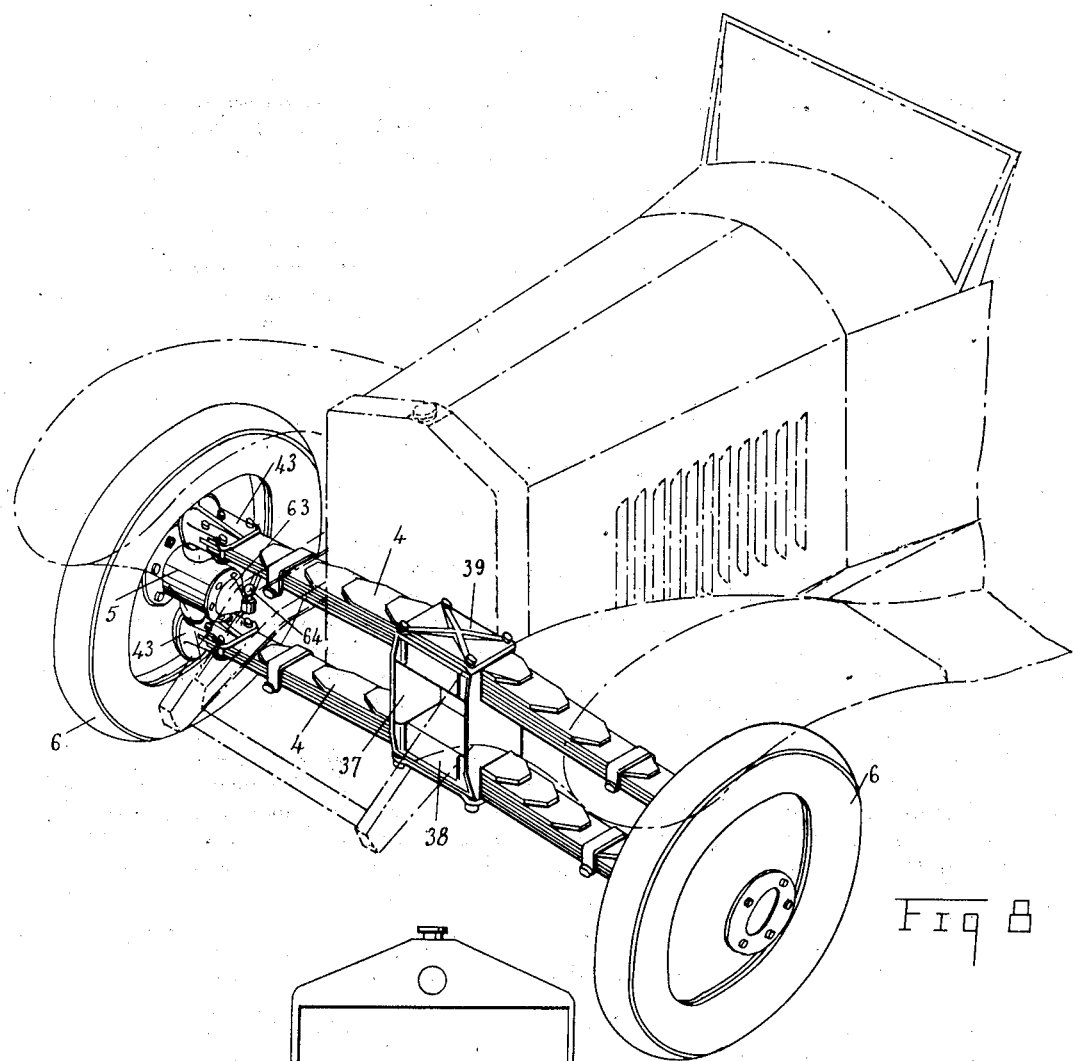
Figure 9:
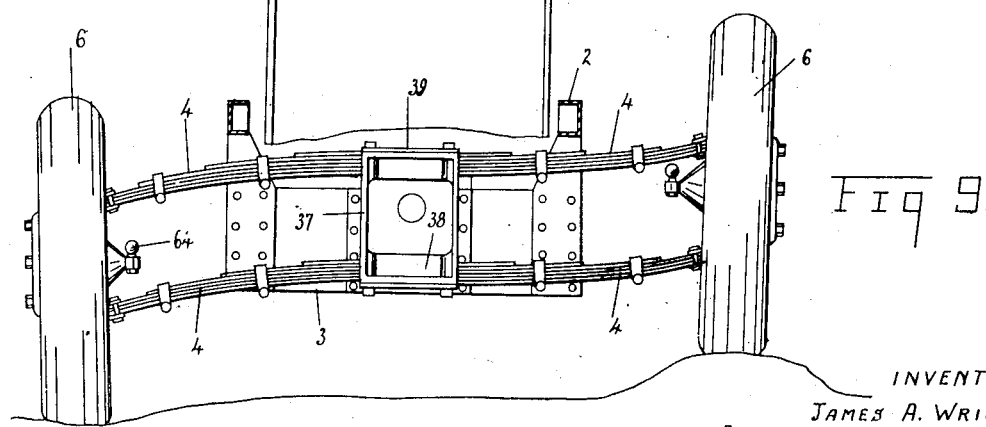

Reference is made to the accompanying drawings in which,

Fig. 1 is a front view partly in section.
Fig. 2 is a plan view partly in section.
Fig. 3 is a side view.
Fig. 4 is a vertical section on the line 4—4 of Fig. 2.
Fig. 5 is a side view of the wheel from within.
Fig. 6 is a partial vertical section of the spring eye and ball pivot.
Fig. 7 is a plan view of the spring eye and ball pivot.
Fig. 8 is a perspective view of the assembly.
Fig. 9 is a front view showing the springs in vertical displacement.

The springs 4, are mounted in the seats 38, of the yoke block 37, which is secured to the front of the chassis frame cross member 3.

The chassis frame 2, shown in the drawings is similar to that of my pending application Serial No. 179,992, filed on the 31st March, 1927, but my invention is not limited to this form of frame in any way.

The ends of the springs 4, enter the spring eyes 43, three leaves 40, 41 and 42, entering the slot 44, of the spring eye 43. The main leaf 40, projects into the extension slot 440, in which it is secured by bolts 431. The upper and lower leaves 41 and 42, are held in position with the main leaf 40, by the side bolts 432. The frictional contact of the three leaves can be adjusted to the required degree by these side bolts.

The spring eye 43, has a split spherical cap 45, mounted on the ball head of the pins 50, 51, screwed into the wheel carrier 5. The halves of the cap 45, are bolted together by the bolts 450. The slot 451, through which the pin passes is oblong and allows the pin to travel only in the vertical plane of the springs.

The wheel carrier 5, is cylindrical, with upper and lower webbed projections, mounted on balanced roller bearings 52, on the sleeve axle 62, integral with the hub 61, of the wheel 6, which is preferably a disc wheel.

The ball headed pins 50, 51, enter screw sockets in the projections of the wheel carrier 5, which is slightly off set from the vertical diameter of the wheel 6, to the front, in order to provide "castor effect" in the wheels, the pins being in the load plane of the wheel.

The brake control mechanism 70, is mounted on a bracket 53, at one side of the wheel carrier 5, while the brake band 71, has an anchor 540, mounted on a downwardly projecting arm 54, on the other side of the wheel carrier 5.

The brake drum 7, is secured between the hub 61, and disc 60, of the wheel 6, by a series of bolts 601.

A conical cap 63, secured to the wheel carrier 5, over the inner end of the sleeve axle 62, has a ball headed pin 64, set vertically in its apex and forms a steering arm by which the wheel is controlled by the steering mechanism.

With this construction the front transverse springs which are broad, support the chassis in the load plane of the wheels, at the point of road contact, through the ball joints which also act as steering pivot bearings, and by means of the spring eyes hold the wheel carriers in position.

The spring eyes secured to the central main leaf which is supported by the upper and lower main leaves between the side bolts, cooperate to maintain the ball joints of the wheel carriers parallel vertically to the chassis at all times and against all stresses.

The upper and lower leaves slide in opposite directions on the central leaf upon the bending up or down of the spring, the slot in which they are held providing ample clearance at their ends. By means of the side bolts the amount of friction between the leaves can be adjusted to suit required conditions and a dampening effect on the spring can be readily obtained.

As the pins of the ball joints can only travel in the slots of the ball caps in the plane of the springs, any tendency to displacement of the wheels is obviated.

The steering arm being in the form of a cone with its apex in the axis of the wheel provides a very strong and direct means of pivoting the wheel on the ball joints of the spring terminals.

What I claim is:—

1. In a front axle assembly the combination of a pair of semielliptic springs mounted vertically parallel in seats in a yoke block secured to a cross member of the chassis frame, the ends of the springs secured in horizontal slots in ball jointed spring eyes, with wheels having hubs from which sleeve axles project, on which the wheel carriers are journalled, having ball headed screw pins above and below on which the spring eyes are mounted in the load plane of the wheel.

2. In a front axle assembly the combination of a pair of semi-elliptic springs mounted vertically parallel in seats in a yoke block secured to a cross member of the chassis frame, the ends of the springs secured in horizontal slots in ball jointed spring eyes, with wheels having hubs from which sleeve axles project, on which wheel carriers are journalled, having ball headed screw pins above and below off set forward of the vertical diameter of the wheel, on which the spring eyes are mounted in the load plane of the wheel.

3. In a front axle assembly the combination of a pair of semielliptic springs mounted vertically parallel in seats in a yoke block secured to a cross member of the chassis frame, the ends of the springs secured in horizontal slots in ball jointed spring eyes, with wheels having hubs from which sleeve axles project, on which wheel carriers are journalled, having ball headed screw pins above and below on which the spring eyes are mounted in the load plane of the wheel, a brake drum mounted on the wheel hub and brake control mechanism supported on brackets at the side of the wheel carrier.

4. In a front axle assembly the combination of a pair of semielliptic springs mounted vertically parallel in seats in a yoke block secured to a cross member of the chassis frame, the ends of the springs secured in horizontal slots in ball jointed spring eyes, with wheels having hubs from which sleeve axles project, on which wheel carriers are journalled, having ball headed screw pins above and below on which the spring eyes are mounted in the load plane of the wheel, and an inwardly projecting conical cap having a ball pin at its apex, secured to the inner end of the wheel carrier adapted to form a steering arm.

5. In a front axle assembly a pair of transverse springs mounted in parallel and securely housed in seats secured to the chassis frame, spring eyes with slots in which the ends of the springs are secured, a wheel carrier having ball headed pins projecting upwardly and downwardly in the load plane of the wheels, journalled in the spring eyes, with means to restrict vertical pivoting to one plane.

6. In a front axle assembly a pair of broad transverse semielliptic springs secured centrally to the chassis frame, spring eyes comprising split ball sockets, having slotted extensions in which the ends of the springs are secured, a wheel carrier having ball headed pins above and below, entering the spring eyes through slots in the vertical plane of the springs, adapted to restrict the vertical movement to that plane.

7. A spring eye having a horizontal slot in which the spring ends are secured and means to adjust the friction between the leaves of the spring entering the spring eye, and journals adapted to be mounted on pivots.

8. A spring eye having a horizontal slot and an extension slot in which the main leaf of the spring is secured by bolts, and side bolts to guide the upper and lower spring leaves entering the slot on the main leaf.

9. In a spring eye a horizontal slot and a central extension slot, with bolts to secure a main spring leaf in the extension slot and bolts to guide the upper and lower leaves entering the slot.

10. In a spring eye a horizontal slot and an extension slot, with bolts to secure a main spring leaf in the extension slot and bolts to adjust the friction between the leaves within the slot.

11. In a transverse spring suspension, wheels journalled in wheel carriers, transverse springs having terminals in the form of split ball sockets coupled to the wheel carrier of the wheel, with slots in the ball sockets adapted to restrict the wheel carrier to vertical movement in the vertical plane of the springs.

JAMES A. WRIGHT.